United States Patent [19]

Marini

[11] 4,280,269

[45] Jul. 28, 1981

[54] METHOD OF SECURING AN ARTICLE TO THE EDGE OF A PANEL

[75] Inventor: Thomas O. Marini, Marlton, N.J.

[73] Assignee: Suntemp Industries, Inc., Blackwood, N.J.

[21] Appl. No.: 6,096

[22] Filed: Jan. 24, 1979

[51] Int. Cl.³ ............................................. B23P 19/00
[52] U.S. Cl. ................................ 29/526 R; 297/454; 403/260
[58] Field of Search ........................... 29/526 R, 91.1; 403/258, 260, 264, 377, 379; 297/454-456

[56] References Cited

U.S. PATENT DOCUMENTS 4,008,971  2/1977  Wah et al. ...................... 403/260 X

FOREIGN PATENT DOCUMENTS 449331  4/1968  Switzerland ............................. 403/258
657257  9/1951  United Kingdom ..................... 403/260

*Primary Examiner*—Charlie T. Moon

*Attorney, Agent, or Firm*—Duffield & Lehrer

[57] ABSTRACT

A U-shaped member having an aperture in the bottom wall thereof and axially aligned apertures in each of the side walls at a point remote from the bottom wall is placed over the edge of a panel such as a sheet of composite board intended to be used as the back of a chair. The U-shaped member carries a nut on the inside surface of the bottom wall in line with the aperture and is securely held in place on the edge of the panel by a rivet passing through the apertures in the side walls and a hole drilled through the surface of the panel. An article such as a portion of the chair frame is secured to the edge of the panel by an elongated bolt which passes through the frame, through the aperture in the bottom wall of the U-shaped member and which is then screwed into the nut being held in place by the U-shaped member. The free end of the bolt enters a hole previously drilled into the edge of the panel in axial alignment with the nut and the aperture in the bottom wall of the U-shaped member.

1 Claim, 3 Drawing Figures

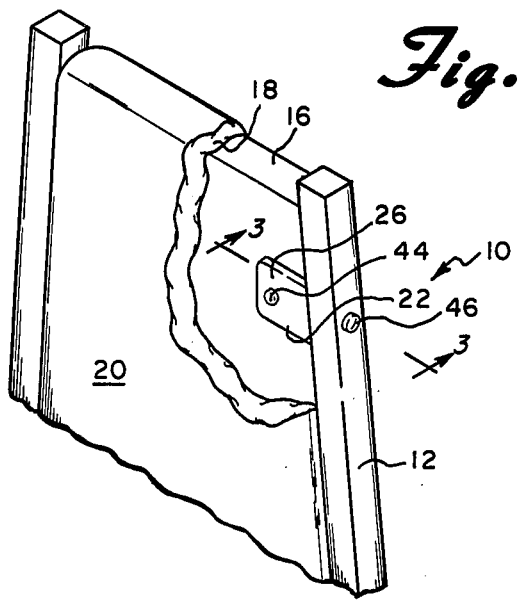
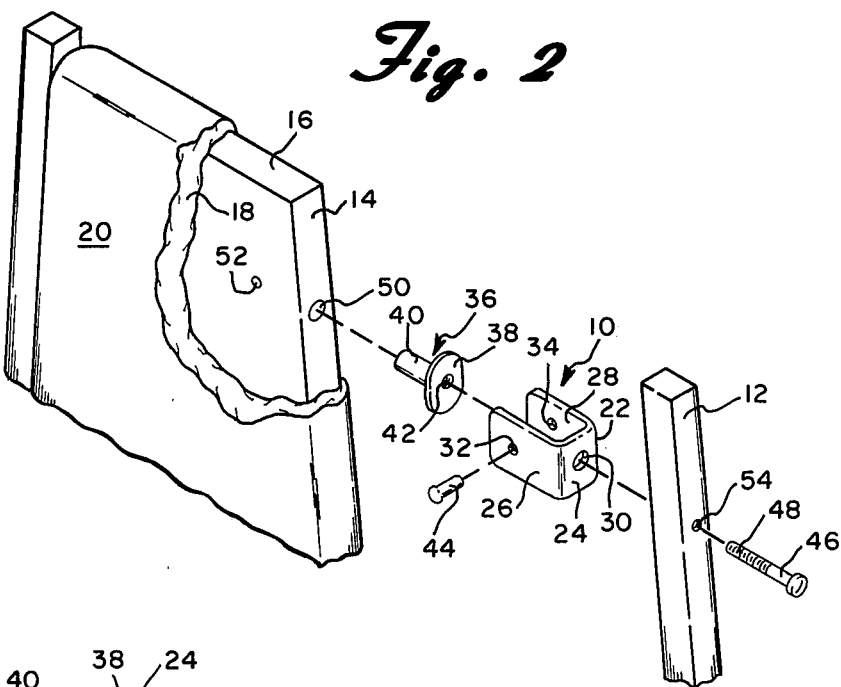
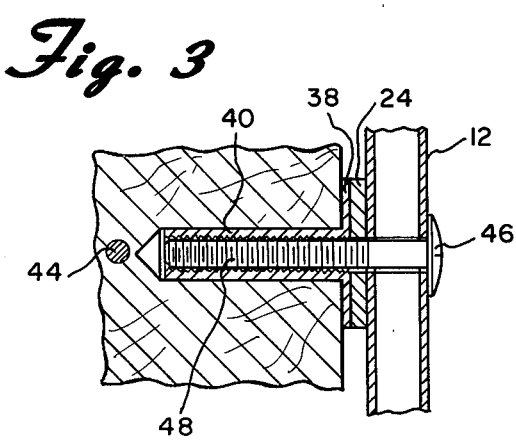

METHOD OF SECURING AN ARTICLE TO THE EDGE OF A PANEL

BACKGROUND OF THE INVENTION

The present invention is directed toward a fastening device and method for employing the same and more particularly toward a device which is particularly useful for securing the edges of chair backs and seats to the chair frame. In the manufacture of furniture, it is often necessary to connect various articles to the edges of panels. For example, the edges of the backs and seats of chairs are often connected to the tubular metal chair frame.

Heretofore, when it was desired to connect the edge of a chair back to the metal frame, it has been common to pass a wood screw through a hole in the tubular frame and to then screw the same into the edge of the chair back. This was normally done after the main structural panel comprising the back of the chair had been padded and covered with vinyl or other sheet like material.

The above-described technique originally proved to be quite satisfactory. This was when the structural panels comprising the chair backs were made of solid wood into which the screw could be securely fastened. However, wood, for the construction of furniture, has become extremely expensive and has therefore been almost exclusively replaced with composite board. As is well known in the art, composite board is comprised of wood chips, sawdust and the like which is compressed into sheet form and held together by binders.

As is also well known in the art, composite board does not hold wood screws as well as solid wood. In addition, composite board is not as strong as solid wood of the same shape and size. Thus, it has been found that when furniture such as chairs are constructed from composite board, the screws holding the frame to the edges of the chair back very often loosen. This occurs when the hole in to which the screw is inserted enlarges or the composite board around the hole fractures. This is a very common occurrence and can be caused by mere normal use of the chair. The result of the foregoing is that the chair eventually breaks and repairs to such composite board chair backs are extremely difficult if not impossible to make.

SUMMARY OF THE INVENTION

The present invention overcomes the problems of the prior art described above by providing a U-shaped member having an aperture in the bottom wall thereof and axially aligned apertures in each of the side walls at a point remote from the bottom wall which is placed over the edge of a panel such as a sheet of composite board intended to be used as the back of a chair. The U-shaped member carries a nut on the inside surface of the bottom wall in line with the aperture and is securely held in place on the edge of the panel by a rivet passing through the apertures in the side walls and a hole drilled through the surface of the panel. An article such as a portion of the chair frame is secured to the edge of the panel by an elongated bolt which passes through the frame, through the aperture in the bottom wall of the U-shaped member and which is then screwed into the nut being held in place by the U-shaped member. The free end of the bolt enters a hole previously drilled into the edge of the panel in axially alignment with the nut and the aperture in the bottom wall of the U-shaped member.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a front perspective view of a chair back, with a portion thereof cut away, showing the present invention in use;

FIG. 2 is an exploded view similar to FIG. 1 showing the various components of the present invention, and FIG. 3 is a cross sectional view taken along the line 3—3 of FIG. 1.

DETAILED DESCRIPTION OF THE INVENTION

Referring now to the drawing in detail wherein similar reference numerals have been used throughout the various figures to identify like elements, there is shown in FIG. 1 a perspective view of a fastening device constructed in accordance with the principles of the present invention and designated generally as 10. FIG. 2 illustrates an exploded view of the fastening device 10 so that the details of each of the components thereof can be seen more clearly.

In the figures, fastening device 10 is shown securing vertical tubular frame member 12 to the edge 14 of panel 16 forming the back of a chair. Panel 16 has a padding material 18 placed thereon which is covered by vinyl or other sheet like material 20 to complete the chair back. The padding 18 and cover 20 have been cut away in the figures for the purpose of illustrating the fastening device.

Fastening device 10 is comprised of a substantially U-shaped member 22 which includes a bottom wall 24 and side walls 26 and 28 which are substantially parallel to each other and which extend from the bottom wall 24. U-shaped member 22 may be formed of sheet metal or plastic or other material and includes an aperture 30 in the bottom wall 24 and apertures 32 and 34 in the side walls 26 and 28, respectively. Apertures 32 and 34 are located at a position remote from the bottom wall 24 and are in substantial axial alignment with each other.

Fastening device 10 also includes a nut 36 which includes a flat head portion 38 and an elongated hollow portion 40 extending therefrom. An internal thread 42 runs through the center of nut 36. Nut 36 is adapted to be positioned on the inside surface of bottom wall 24 with the threaded bore 42 in axial alignment with the aperture 30. As shown in FIG. 2, the shape of the head portion 38 of nut 36 is somewhat oblong so that when it is positioned within the U-shaped member 22, it is prevented from rotating.

Completing the fastening device 10 is an elongated rod shaped member such as a rivet 44 or the like which is adapted to pass through and be held in the apertures 32 and 34 in the side walls 26 and 28. Also included is an elongated bolt 46 which has an external thread 48 on the end thereof. External thread 48 is complementary to internal thread 42 of the nut 36.

The fastening device 10 is used in the following manner. First, a hole 50 is drilled or otherwise formed in the edge 14 of panel 16. Hole 50 is substantially perpendicular to the edge 14. A second hole 52 is formed through the face of panel 16 at a point spaced from the edge 14.

Hole 52 is perpendicular to but intersects the axis of hole 50.

After forming the holes 50 and 52, the forward end 40 of nut 36 is inserted into hole 50. The U-shaped member 22 is then placed over the nut 36 and the edge 14 of the panel 16. Rivet 44 is then inserted through aperture 32, hole 52 and aperture 34 and is secured in place at its free end in the known manner. The chair back is then completed by covering the panel 16 with the padding 18 and the cover 20 and a small hole is formed in the cover and padding overlying the aperture 30.

When it is desired to secure the chair back to the frame 12, screw 46 is inserted through hole 54 formed in the tubular frame member 12. The free end of bolt 46 then passes through the small hole in the cover 20 and padding 18 and through the aperture 30 until it engages the threaded bore 42 in nut 36. At this time, bolt 46 is turned and as it threads itself into the nut 36, tubular frame member 12 is secured tightly to the panel 16 of the chair back.

The present invention may be embodied in other specific forms without departing from the spirit or essential attributes thereof and accordingly, reference should be made to the appended claims, rather than to the foregoing specification as indicating the scope of the invention.

I claim:

1. A method of securing an article to the edge of a panel including the steps of:
   forming an elongated first hole in the edge of said panel substantially perpendicular to said edge;
   forming a second hole through said panel inwardly of said edge, said second hole being formed in substantial axial alignment with said first hole but perpendicular thereto;
   placing a U-shaped member over said edge of said panel such that the bottom wall of said member overlies said first hole and the side walls of said member overlie said second hole;
   passing an elongated rod shaped element through apertures in the side walls of said U-shaped member and through said second hole to thereby secure said U-shaped member to said panel;
   covering said panel with padding and a sheet like material cover;
   passing an elongated bolt through an article to be secured to the edge of said panel;
   passing said bolt through an aperture in said padding and cover and in said bottom wall of said U-shaped member to engage a nut positioned between said side walls adjacent said bottom wall and in line with said first hole, and
   turning said bolt so that the end thereof threads into said nut and moves into said first hole until said article is secured to the edge of said panel.

* * * * *